Aug. 13, 1957     A. F. ANJESKEY ET AL     2,802,910

TROLLEY CONDUCTOR BAR

Filed Dec. 26, 1951

INVENTORS
ALPHONSE F. ANJESKEY
BY HARRY A. COTESWORTH

ATTORNEYS

United States Patent Office 2,802,910
Patented Aug. 13, 1957

2,802,910

TROLLEY CONDUCTOR BAR

Alphonse F. Anjeskey, Cleveland, and Harry A. Cotesworth, Cleveland Heights, Ohio, assignors to The Cleveland Crane & Engineering Company, Wickliffe, Ohio, a corporation of Ohio Application December 26, 1951, Serial No. 263,154

1 Claim. (Cl. 191—23)

The present invention relates to a trolley conductor bar having a longitudinally extending channel formation to receive a current collecting shoe and a second longitudinally extending channel formation or aperture adapted to receive a connector member by which two like conductor bars, or severed segments of such bars, can be mechanically and electrically connected to form an extended trolley.

The principal object of the present invention is the provision of a new and improved trolley conductor bar of the character referred to which is fabricated of a metal strip, such as steel or copper strip, so that it can be manufactured of a minimum amount of metal and by relatively inexpensive rolling processes, and yet provide the required strength and durability of similar conductor bars formed by other processes such as extruding, casting or forging.

The invention resides in certain details of construction and arrangements of parts, and further objects and advantages will be apparent to those skilled in the art to which the invention relates from the following description of the preferred embodiments described with reference to the accompanying drawings in which similar reference characters designate corresponding parts, and in which—

Figures 1, 2, 3:
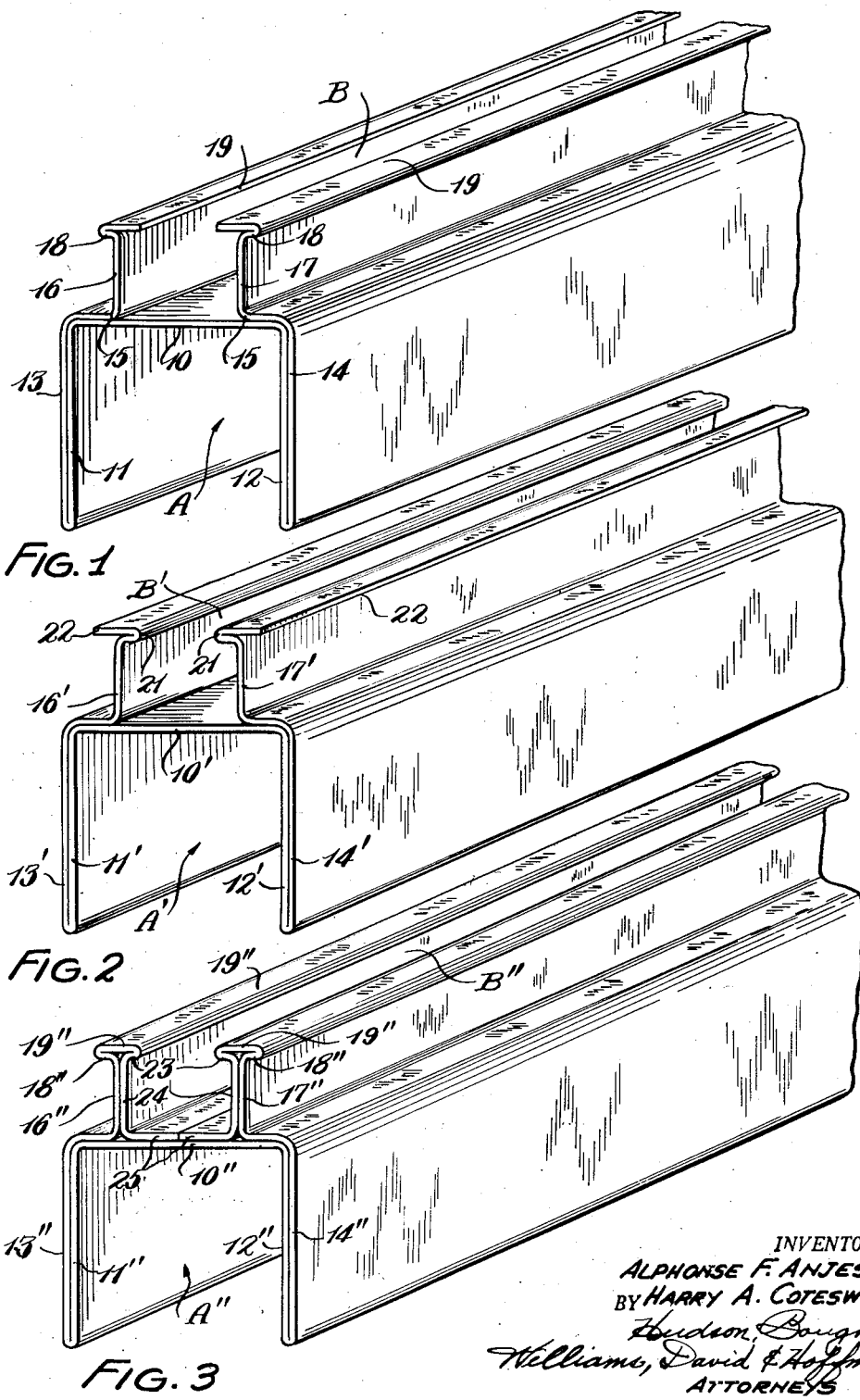
Fig. 1 is a perspective view of an end portion of a trolley conductor bar embodying one form of the invention.
Fig. 2 is a view similar to that of Fig. 1 but showing another embodiment of the invention.
Fig. 3 is a view similar to Fig. 1 but showing still another embodiment of the invention.

As mentioned previously, the present invention is directed to a trolley conductor bar which can be connected with other conductor bars to form a continuous trolley such as that employed in overhead carrier systems, and which may be similar to that disclosed in U. S. Patent 2,358,116. Referring to Fig. 1 of the drawing a trolley conductor bar is shown which is preferably formed of a copper clad steel strip, although any other suitable strip material could be employed. The steel strip is preferably initially flat or coiled and in forming the conductor bar of the present invention the medial portion thereof is shaped to provide a longitudinally extending channel A, having a bottom wall 10 and two opposed side walls 11, 12, for receiving current collector shoes, not shown.

The intermediate side portions of the strip are folded back on the respective sides 11, 12 of the channel so that the sides thereof are re-enforced by layers 13, 14 respectively. The portions of the strip adjacent to the segments at 13, 14 are bent inwardly along the outer side of the bottom wall 10 of the channel, and extend to points 15 short of the central portion of the bottom wall and are there turned outwardly to form a channel B having opposite parallel sides 16, 17 and the bottom of which is common with the bottom wall 10. It will be noticed that the width of the channel B formed by the walls 16, 17 is preferably less than that of the channel A.

The opposite edge portions of the strip adjacent to the sections 16, 17 are turned outwardly as at 18 to form a lip or flange projecting outwardly along the upper edges of the channel walls 16, 17 and the extreme outer edge portions of the strip are reversely bent on the lips 18 and project inwardly to form ledges 19 projecting inwardly from the top edges of the walls 16, 17 and provide a longitudinally extending aperture along the conductor bar on the opposite side of the channel A.

As mentioned, the channel A is adapted to receive a current collecting shoe or the like, and the aperture B is adapted to receive connector members, not shown, inserted in the ends thereof. The walls forming aperture B are adapted to embrace connector members extending into the apertures at the ends of two abutting aligned conductor bars and thereby form good electrical and mechanical connections between the conductor bars. The side walls 16, 17 and flanges 18 provide means by which a suitable insulating covering can be retained over the bar and also provides a gripping surface for securing the bar to clamp type trolley hangers, not shown here but described in the aforesaid patent.

The conductor bar shown in Fig. 2 may be formed similarly to the conductor bar shown in Fig. 1 and similar parts thereof are indicated by like reference characters bearing a prime. The form of the invention shown in Fig. 2 varies from that shown in Fig. 1 in that the walls 16', 17' have inwardly projecting ledges 21 formed along the top edges thereof by folded portions of the strip, and the outer edges of the strip project outwardly from the top edges of the walls 16', 17' to form lips 22 which correspond to the lips 18 of the form shown in Fig. 1.

The conductor bar shown in Fig. 3 is similar to that shown in Fig. 1 and like parts are designated by like reference characters bearing a double prime. The conductor bar of Fig. 3 differs from the bar shown in Fig. 1 by having folded portions 23 forming double walls for the inwardly projecting ledges 19" and which extend outwardly to the walls 16" and 17" and then downwardly therealong as at 24 to provide double side walls for the aperture B", and the extreme outer edge portions of the strip are turned inwardly as at 25 to form a double wall for the bottom wall of the aperture and the channel A".

The material of which the conductor bars are formed may be bent and otherwise formed by any suitable process, such as by rollers, and the various portions may be formed in any order deemed desirable. The walls of the channel A and aperture B are shown substantially planar, but it is to be understood that one or more could be arcuate, if desired.

It will be seen that by our invention we have provided a rigid and durable conductor bar having a channel for receiving a current collecting shoe or the like and a longitudinally extending aperture along one side thereof having ledges and lips by which a plurality of conductor bars can be connected in end-to-end alignment by connector members and supported by suitable clamps etc. to provide an extended trolley. The conductor bars can be formed inexpensively and provide light weight construction for ease of handling and installation and can be severed at any point therealong and the severed bars attached in the trolley.

While preferred embodiments of the invention have been shown it is our intention to cover all adaptions, modifications, and changes therein which come within the practice of those skilled in the art to which the invention relates and the scope of the appended claim.

Having thus described our invention, we claim:

A trolley conductor bar comprising an elongated metal strip of high electrical conductivity having the medial portion thereof in the shape of a U-shaped rectangular channel and the outer portions thereof reversed to extend alongside the outer sides of said channel, and inwardly along the outer side of the bottom wall of said channel and turned outwardly from said bottom wall short of the median thereof to form sides of a second channel in a plane parallel to the plane of the sides of said first channel and lying contiguous to the bottom of the first-mentioned channel, the outer portions of said strip turned laterally in one direction of said sides of said second channel and having the ends thereof folded back on said laterally turned portions and projecting to the other side of said sides of said second channel.

References Cited in the file of this patent

UNITED STATES PATENTS

| | | |
|---|---|---|
| 997,677 | Ivey | July 11, 1911 |
| 1,147,836 | Allmand | July 27, 1915 |
| 1,704,314 | Edwards et al. | Mar. 5, 1929 |
| 1,800,008 | Cronmiller et al. | Apr. 7, 1931 |
| 2,013,207 | Hamm et al. | Sept. 3, 1935 |
| 2,210,171 | Horn | Aug. 6, 1940 |
| 2,322,640 | Jackson | June 22, 1943 |
| 2,358,116 | Wehr | Sept. 12, 1944 |
| 2,361,721 | Van Deventer | Oct. 31, 1944 |